May 8, 1962     I. ERLICHMAN     3,033,442
BAG LOCKING MECHANISM
Filed March 14, 1960     3 Sheets-Sheet 1
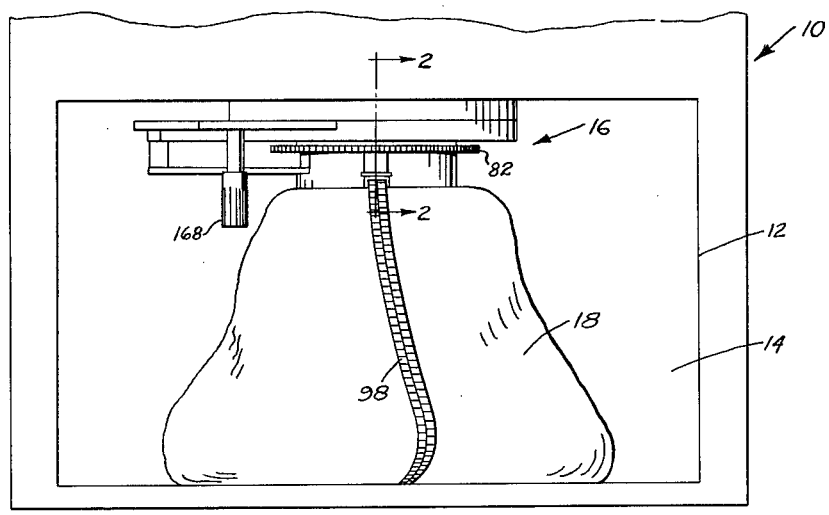
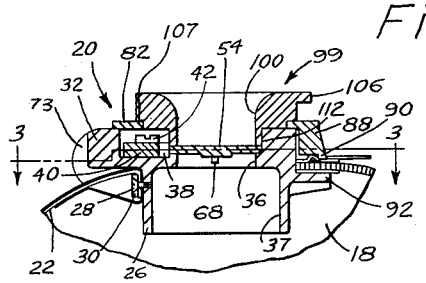
Fig. 1
Fig. 2
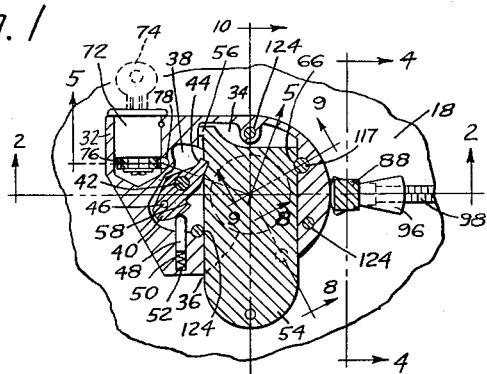
Fig. 3
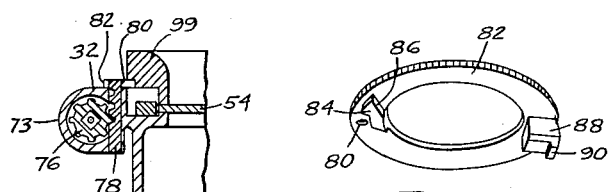
Fig. 5     Fig. 6
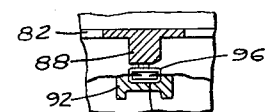
Fig. 4
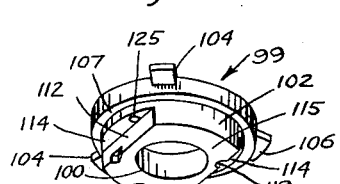
Fig. 7     Fig. 8
INVENTOR.
Irving Erlichman
BY
*Salter & Michaelson*

May 8, 1962 I. ERLICHMAN 3,033,442
BAG LOCKING MECHANISM
Filed March 14, 1960 3 Sheets-Sheet 2
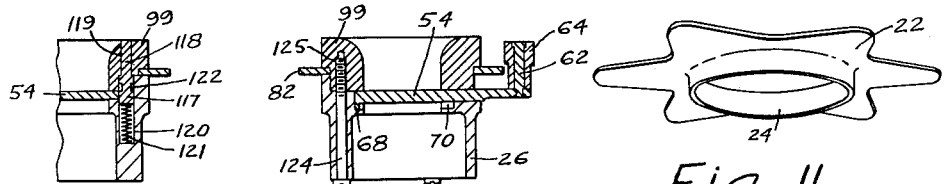
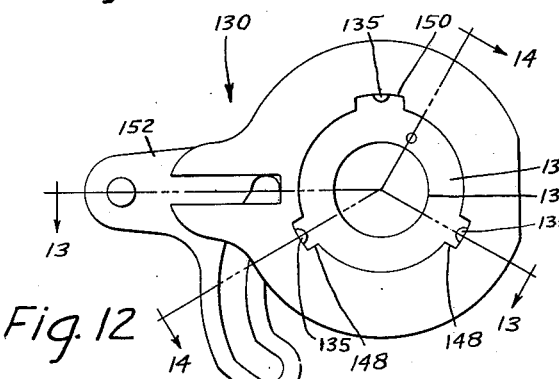
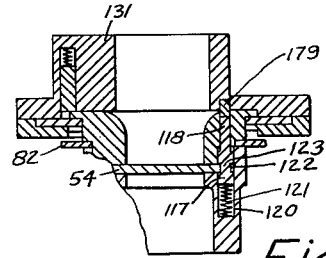
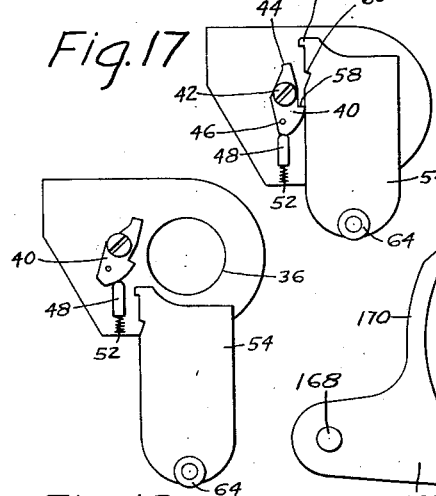
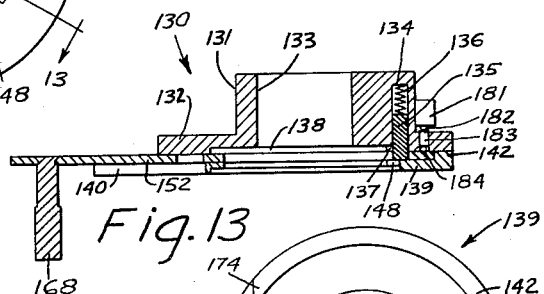
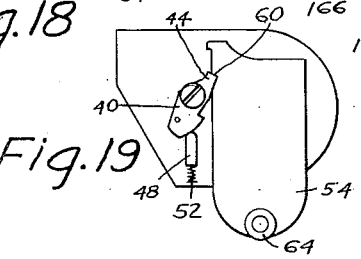
INVENTOR.
Irving Erlichman
BY Salter + Michaelson May 8, 1962 I. ERLICHMAN 3,033,442
BAG LOCKING MECHANISM
Filed March 14, 1960 3 Sheets-Sheet 3

INVENTOR.
Irving Erlichman
BY
Salter + Michaelson

United States Patent Office 3,033,442
Patented May 8, 1962

3,033,442
BAG LOCKING MECHANISM
Irving Erlichman, Natick, Mass., assignor to Universal Controls, Inc., New York, N.Y., a corporation of Maryland
Filed Mar. 14, 1960, Ser. No. 14,682
17 Claims. (Cl. 232—15)

The present invention relates to a bag locking mechanism that is to be utilized in fare collection and registering apparatus. More particularly, the present invention relates to a tamper-proof receptacle that is adapted to prevent unauthorized removal of coins from a flexible bag when the bag is removed from its position within a coin machine.

Although the bag locking device embodied herein has application in related fields, the intended purpose or use thereof is with fare collection and registering apparatus wherein the bag or receptacle is mounted beneath a coin machine and is adapted to communicate therewith for receiving fare parts that are processed therethrough. The bag locking device also has particular application in conjunction with a flexible or cloth bag as contrasted with a metallic box structure that is usually associated with coin machines. Since the flexible bag is light in weight and easily handled, it is desirable to incorporate this type of receptacle into fare collection apparatus. However, prior to the instant invention, suitable means for preventing unauthorized entry into the bag have not been available. Since the bag containing the coins must be removed intact from the coin machine and transported to a coin receiving and counting station, it is desirable to lock the bag in some fashion upon its removal from engagement with the coin machine, thereby preventing unauthorized personnel from gaining access to the interior of the bag. In order to prevent the person who removes the coin bag from the coin machine from gaining entry into the bag, the mouth of the bag must be automatically locked upon the removal of the bag from the coin machine. Accordingly, one of the objects of the present invention is to provide an automatic bag locking device wherein the mouth of the bag is sealed upon removal of the bag from the coin machine, the closure means that seals the bag being preconditioned and reset to automatically open when the bag is again inserted or secured to the coin machine after the removal of coins therefrom.

Another object of the present invention is to provide a flexible pouch or bag for use in a coin receiving machine that is automatically locked upon the removal thereof from the coin machine.

Still another object of the present invention is to provide means for positively locking the mouth of a flexible pouch upon its removal from a coin receiving machine.

Still another object is to provide a coin receptacle for use in coin machines that includes tamper-proof mechanism that insures the safety of the coins deposited within the receptacle and that cannot be removed by unauthorized personnel.

Still another object is to provide an interlock system for a bag locking device for use in a coin machine wherein the coin machine may be operated only if the bag is properly mounted in the coin machine.

Still another object is to provide a flexible pouch or bag having a zipper locking device secured thereto, access to the locking device being available only to authorized personnel after removal of the bag from its position on a coin machine.

Still another object is to provide a locking device for use in a bag locking mechanism that enables a zipper to be opened for gaining access to the interior of the bag without opening the mouth thereof.

Still another object is to provide a closure device for use in a bag locking mechanism that is automatically reset for closing the mouth of the bag when the bag is mounted in position in a coin machine.

Other objects, features and advantages of the invention will become apparent as the description thereof proceeds when considered in connection with the accompanying illustrative drawings.

In the drawings which illustrate the best mode presently contemplated by me for carrying out my invention:

FIG. 1 is an elevational view illustrating the bottommost end of a coin machine, the bag locking mechanism embodied herein being mounted in the coin machine together with the flexible bag attached thereto;

FIG. 2 is a sectional view taken along line 2—2 in FIG. 1;

FIG. 3 is a sectional view taken along line 3—3 in FIG. 2;

FIG. 4 is a sectional view taken along line 4—4 in FIG. 3;

FIG. 5 is a sectional view taken along line 5—5 in FIG. 3;

FIG. 6 is a perspective view of the locking device actuating ring;

FIG. 7 is a perspective view of a fitting which secures the removable portion of the locking device to the permanent portion that is attached to a coin machine.

FIG. 8 is a sectional view taken along line 8—8 in FIG. 3;

FIG. 9 is a sectional view taken along line 9—9 in FIG. 3;

FIG. 10 is a sectional view taken along line 10—10 in FIG. 3;

FIG. 11 is a perspective view of a spider member that is adapted to be secured to the neck or mouth of the pouch shown in FIG. 1, thereby retaining the mouth of the pouch in a distended position;

FIG. 12 is a plan view of the assembled shutter guide and actuator, wherein the relative position thereof when mounted in the coin machine is illustrated;

FIG. 13 is a sectional view taken along line 13—13 in FIG. 12;

FIG. 14 is a sectional view taken along line 14—14 in FIG. 12;

FIG. 15 is a plan view of the shutter actuator;

FIG. 16 is a plan view of the retainer and guide for the shutter actuator;

FIG. 17 shows the bag opening shutter in the closed position thereof and prior to removal of the bag from the coin machine;

FIG. 18 shows the position of the shutter after the bag has been mounted in the coin machine;

FIG. 19 shows the position of the shutter after the bag has been removed from the coin machine;

Figure 20:
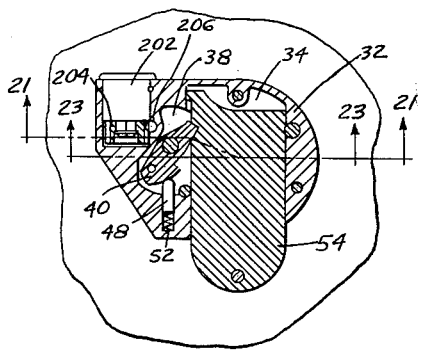
FIG. 20 is a sectional view similar to FIG. 3, illustrating a modified form of the invention.

Referring now to FIG. 1, the present invention is illustrated in the manner in which it is installed in a coin machine. The coin machine which is generally indicated at 10 may be of any conventional design and is normally installed in public transportation vehicles, automatic toll collection stations, or at any coin controlled gate, such as that located in a subway station. The coin machine 10 as shown includes an opening 12 that is formed in the lowermost end of one of the side walls thereof, the opening 12 providing access to a lower chamber indicated at 14. The chamber 14 is adapted to be enclosed by any suitable door construction that would cover the opening 12. The bag locking device is generally indicated at 16, and, as will be described hereinafter, several of the components of the bag locking device 16 are secured to the upper wall of the chamber 14 while the remaining components thereof are mounted in the mouth of a bag indicated at 18. The bag 18 is shown as a flexible pouch and may be constructed of a cloth, flexible plastic, or any other suitable material that will withstand wear and handling. It is, of course, understood that although the present invention is adapted for use primarily with a flexible bag or pouch, the fundamental concept of the bag locking device may be incorporated in a receptacle formed of rigid material, such as metal, plastic or wood.

Referring now to FIGS. 2 and 3, that portion of the bag locking device 16 that is secured to the bag 18 is illustrated and is designated as neck assembly 20. The neck assembly 20 includes a star-shaped spider 22 (FIG. 11) that is formed with an annular depending portion 24 that defines an opening, the depending portion 24 being secured within the mouth of the bag 18. The spider 22 is adapted to distend the upper end of the bag 18, thereby properly positioning it for reception of the neck assembly 20 and further extends the sides of the bag outwardly to prevent collapsing thereof. The spider 22 may be formed of a plastic material and is clamped to a neck section 26 by screws 28 that extend through a metal ring 30. In assembling the neck assembly to the bag 18, the neck of the bag 18 is first folded over the spider 22 and allowed to remain unattached. Prior to securement of the bag neck to the inner surface of the spider 22, the depending portion 24 of the spider is secured to the neck section 26 by the screws 28 that extend through the ring 30, the ring cooperating with the neck section to securely clamp the spider depending portion 24 and the bag neck therebetween. The bag neck is then secured to the inner surface of the spider 22 as shown in FIG. 2 by an adhesive or the like. As seen in FIG. 2 the neck section 26 extends within the interior of the bag 18 and has an upper flange 32 formed integrally therewith. Referring to FIG. 3, the flange 32 is shown being formed with an irregular recess 34 through which an opening 36 extends, the opening 36 communicating with an opening 37 formed in the neck section 26 (FIG. 2). Communicating with the recess 34 is an irregular recess 38 in which a detent or pawl 40 is pivotally mounted by a pin 42. Formed on the detent 40 is a reduced end 44 that is adapted to engage a notch formed in a closure member or shutter, and is thereby adapted to lock the shutter in the closed position thereof as will be described hereinafter. Projecting outwardly from the detent 40 on the end opposite the reduced end 44 is a pin 46 that is adapted to be contacted by a cam for pivoting the detent 40 as will also be described hereinafter. A pin 48 is mounted in an opening 50 formed in the flange 32 and is urged outwardly by a spring 52 into engagement with an arcuate surface formed on the detent 40 and in effect defines an over-center control means for retaining the detent 40 in either the locking position as illustrated in FIG. 19 or in the unlocking position as illustrated in FIG. 17.

Slidably mounted in the recess 34 is a closure member or shutter 54 that is adapted to be reciprocated by a shutter operator to be described hereinafter for either opening or closing the opening 36 in accordance with the position of the bag 18 with respect to the coin machine. Formed on one side of the inner end of the shutter 54 is a projection 56 that is adapted to engage a notch 58 formed in the detent 40 upon outward movement of the shutter to the open position thereof. As will be described in the operation of the device, this movement of the shutter 54 returns the detent to the position in which the reduced end 44 engages the shutter for locking it in the closed position thereof.

As shown in FIGS. 17 and 18, the shutter 54 is formed with a notch 60 on the edge thereof adjacent the detent 40, the notch 60 being adapted to receive the reduced end 44 of the detent when the shutter is located in the locked position thereof. The shutter 54 is formed such that it extends outwardly of the flange 32, terminating in a rounded end portion. Secured to the rounded end portion adjacent the end thereof by means of an elongated bearing 62 is a roller 64, the bearing 62 being threaded at the lower end thereof for engagement with the shutter 54. As shown in FIG. 3, the shutter 54 is also formed with an arcuate groove 66, the purpose of which will hereinafter be described. In order to limit outer movement of the shutter 54, a stop pin 68 (FIG. 10) is formed on the underside of the inner end thereof and is adapted to engage the end of a recessed slot 70 when the shutter 54 is moved to the outermost position thereof (FIG. 18), the slot 70 thereby cooperating with the pin 68 to limit the shutter in the outer movement thereof.

In order to unlock the shutter 54 from the latched position thereof (FIGS. 3 and 19), a lock indicated at 72 is provided and is positioned in a suitable opening formed in the flange 32. The lock 72 includes conventional tumblers that are adapted to be actuated upon the insertion and rotation of a key 74, indicated in dotted lines, into a keyway, access to which is available exteriorly of the lock 72.

Referring now to FIG. 5, the flange 32 is shown being integrally formed with a lock housing 73 that accommodates the lock 72 therein, a gear 76 being connected to the lock mechanism and adapted to be rotated upon insertion and rotation of the key 74 in the keyway thereof. Engaging the gear 76 is a rack or plunger 78 that is adapted to be reciprocated upon rotation of the gear 76. The upper end of the plunger 78, as illustrated in FIG. 5, is adapted to project into an opening 80 formed in an actuating ring 82 that is more clearly illustrated in FIG. 6. As shown in FIG. 2, the actuating ring 82 engages the flange 32 of the neck assembly 20 and is disposed in substantially concentric relation with respect to the openings 36 and 37. Formed on the underside of the actuating ring 82 is a cam 84 which has a surface 86 that is adapted to engage the pin 46 of the detent 40. Also formed on the underside of the actuating ring 82 and spaced approximately 180° therefrom is a lug 88 that has a depending portion 90 formed thereon. When the actuating ring 82 is located in the locked position thereof (FIG. 2), the depending portion 90 projects over an extension 92 that is formed integral with the neck 26. Formed between the ends of the extension 92 is a recess 94 (FIG. 4) that is adapted to receive a zipper operator 96 in the locked position thereof. As illustrated in FIG. 4, the zipper operator 96 is formed as part of a zipper assembly that is indicated at 98 in FIG. 1. Thus, when the coacting elements of the zipper 98 are located in the closed position thereof, the operator 96 is positioned in the recess 94, and the projection 90 formed on the lug 88 extends over the recess 94 thereby locking the operator therein and preventing opening of the zipper until the key 74 unlocks the actuating ring 82.

In the operation of the shutter 54 which will be described hereinafter, it is moved to the closed position thereof shown in FIGS. 3 and 19 when the bag 18 is to be removed from the coin machine for emptying the coins deposited therein. Thus, when the bag 18 is withdrawn from the chamber 14 and transported to a coin collecting station, it is necessary that the opening 36 be closed so that unauthorized personnel cannot gain access to the interior of the bag. Once the bag has been brought to the coin collecting station, the authorized personnel may insert and turn the key 74 in the lock 72 which releases the actuating ring 82. Rotation of the actuating ring 82 causes the lug 88 and depending portion 90 to uncover the zipper operator 96, and the zipper 98 may then be opened so that the coins deposited in the bag 18 can be removed therefrom. Rotation of the actuating ring 82 also causes the surface 86 of the cam 84 to strike the pin 46, and continued movement of the actuating ring 82 causes the detent 40 to be pivoted to the position shown in FIG. 17. The over-center action of the spring loaded pin 48 retains the detent 40 in the position shown in FIG. 17. The shutter 54 is now unlocked and ready for movement outwardly to the position shown in FIG. 18 when the bag is inserted into the coin machine, in which position the opening 36 will communicate with the coin chute of the coin machine.

The neck assembly 20 is completed by a fitting 99 that is formed with a flared central opening 100 therein that is adapted to communicate with the opening 36 in the flange 32. The fitting 99 as shown in FIG. 7 is formed with a body 102 that is provided with spaced ears, two of which are identical and are indicated at 104, and the other of which is somewhat wider than the ears 104 and is indicated at 106. The body 102 is formed with an annular groove 107 and is further cut out along two sides thereof to form parallel side walls 112 and shoulders 114. As shown in FIG. 2, the side walls 112 fit within the recess 34 of the flange 32, while the lowermost surface of the groove 107 engages the actuating ring 82 for securing the actuating ring in the neck assembly 20. The shoulders 114 engage the upper surface of the flange 32 and thereby space the bottom surface 115 of the body 102 from the bottom of the recess 34. This space accommodates the shutter 54 and is dimensioned to allow the shutter to easily slide to the outer or inner position thereof. Referring to FIGS. 7, 9 and 14, a lock pin 117 having a reduced outer end 118 is shown extending through an opening 119 formed in the fitting 99 and into an opening 120 formed in the flange 32 and neck 26, the lock pin being limited in the outer movement thereof by engagement of the shoulder formed by the junction of the lock pin and its reduced outer end with the bottom surface 115 of the fitting 99. A spring 121 positioned in the lowermost end of the opening 120 normally urges the lock pin 117 outwardly to the position shown in FIG. 9. The lock pin 117 is formed with an annular groove 122 that defines a reduced central portion 123, and is adapted to move within the groove 66 formed in the shutter 54. As shown in FIGS. 3 and 9 when the body of the lock pin 117 is located in the groove 66, the shutter 54 is locked from movement. However, when the pin is urged downwardly to the position shown in FIG. 14, the groove 122 communicates with the groove 66 and since the diameter of the reduced central portion is dimensioned to just clear the outer edge of the shutter, the shutter is free of the lock pin 117. As will be described hereinafter, means are provided for automatically depressing the lock pin 117 when the bag and neck assembly are installed in the coin machine. Bolts indicated at 124 in FIG. 3 extend through the neck 26, flange 32 and engage threaded openings 125 formed in the fitting 99 and thereby lock these parts together as a unit.

The shutter 54 is further retained in the closed position thereof by a ball 126 (FIG. 8) that is positioned in an opening 127 formed in the flange 32 and neck 26 and is urged outwardly by a spring 128. A groove 129 is formed on the underside of the shutter 54 and receives the ball 126 therein when the shutter is properly located in the closed position thereof. When the ball 126 is located in the groove 129, the locking position in effect is reached. Upon outward movement of the shutter, the ball 126 will be forced out of the groove 129 and depressed into the opening 127.

In order to lock the neck assembly 20 together with the bag 18 in the coin machine, a retainer assembly generally indicated at 130 in FIG. 12 is provided. The retainer assembly 130 includes a block 131 which has a flange 132 formed thereon. The flange 132 is bolted directly to the underside of the coin machine, and extending therethrough and the block 131 is an opening 133 that is adapted to communicate with the coin discharge chute of the coin machine 10. Formed in the flange 132 and extending into the block 131 are three equally spaced openings 134 in which are positioned pins 135 that are urged outwardly by springs 136. The pins 135 extend through grooves 137 that are formed in the underside of the flange 132, the grooves 137 communicating with an annular recess 138 formed in the flange 132. Secured to the flange 132 is a guide generally indicated at 139 (FIG. 16) the main portion of which is substantially circular in configuration. Formed as an integral part of the guide 139 is an extension 140 in which a slot 141 is formed. The outer edge of the guide 139 as seen in FIG. 16 is formed with a peripheral flange 142 that defines a recess, the surface of the recess defining a ring 144 that is formed integral with and that is located in the same plane as the extension 140. Formed in the ring 144 is a central opening 146 in which are formed spaced slots 148 that are adapted to receive ears 104 therein and an enlarged slot 150 that is adapted to receive ear 106 therein. The slots 148 and 150 are in alignment circumferentially with respect to the pins 135 but are offset slightly with respect thereto so that when the pins 135 are located in the outer position thereof they engage the edge of the surface of the ring 144 adjacent the slots 148, 150 and are therefore prevented from entering therein.

Positioned within the ring 144 of the guide 139 and overlapping the projection 140 is an actuator or shutter operator generally indicated at 152 in FIG. 15. The actuator 152 is positioned in flush engagement with the flange 132 and is retained thereagainst by the guide 139 that is secured directly to the flange 132. The actuator 152 is formed with a ring portion 154 that fits directly in the recess defined by the ring 144, the opening 156 in the ring portion 154 having equal slots 158 formed therein, that correspond to the slots 148 and which have a semi-circular groove 160 communicating therewith. An enlarged slot 162 is also formed in the ring portion 154 and corresponds to the slot 150 in the guide 139, a semi-circular groove 164 also communicating with the slot 162. With the retainer assembly 130 disposed in the unlocked position, the pins 135 that are in alignment with the grooves 160, 164 extend therein and abut against the ring 144, thereby locking the actuator 152 against movement. Extending outwardly of the actuator ring portion 154 is a lever 166 to which a depending handle 168 is secured on the outermost end thereof (FIG. 13). Integrally joined to the lever 166 and the ring portion 154 is an arcuate member 170 in which an arcuate slot 172 is formed. The actuator 152 is adapted to be rotated relative to the guide 139 and for this purpose the ring portion 154 is positioned in the guide recess that is defined by the flange 142 and ring 144. Thus, the ring portion 154 may be rotated within the recess of the guide 139, the walls of the peripheral flange 142 acting as a bearing therefore. Accordingly, the ring portion 154 may be rotated relative to the ring 144, thereby moving the slots 158 and 162 relative to the slots 148 and 150. The limit of movement of the actuator 152 with respect to the guide 139 is defined by the ends of the peripheral flange 142 indicated at 174 and 176. The junction of the ring portion 154 and the arcuate member 170 indicated at 178 on the actuator 152 is adapted to contact the stop 174 in one position of movement of the actuating member, and the junction of the lever 166 with the ring portion 154 indicated at 180 is adapted to engage the stop 176 to define another limit of movement of the actuator. In all positions of movement of the actuator 152 with respect to the guide 139, a portion of the arcuate slot 172 is always in alignment with the slot 141.

In order to reciprocate the shutter 54, the roller 64 secured thereto is positioned within the slots 141 and 172 of the guide 139 and actuator 152 respectively. Upon rotary movement of the actuator 152 by the operator of the device, the roller 64 will be caused to follow the slot 141, thereby imparting linear movement to the shutter 54. It is thus seen that when the bag 18 and neck assembly 20 are secured to the retainer assembly 130, the roller 64 is forced into the slots 141 and 172. Since the shutter 54 has been preconditioned so that it is in an unlatched position as shown in FIG. 17, movement of the actuator 152 will cause the closure 54 to be pulled outwardly to the position shown in FIG. 18.

With the retainer assembly 130 located in the position shown in FIG. 12, the neck assembly 20 may be secured thereto and in carrying out the assembly, the large ear 106 is adapted to be inserted in the slots 150 and 162. Since the large ear 106 may fit only in the slots 150 and 162, the component parts of the two assemblies are properly aligned for interengagement thereof. With the slots 158 aligned with the slots 148 and the slot 150 aligned with the slot 162, the pins 135 project into the grooves 160 and 164 to lock the actuator 152 against movement. The neck assembly is then inserted into the retainer assembly 130, the ears 104 being received within the aligned grooves 148 and 158. The ear 106 extends also through its aligned grooves 150 and 162 and the flange 102 of the fitting 99 is received within the recess 138 of the flange 132. Further depression of the neck assembly 20 causes the pins 135 to be retracted against the action of the springs 136 into their openings 134 and retained therein by the ears 104, 106 that extend into the grooves 137. The actuator member 152 is then released for movement, and since the ears 104 and 106 have been inserted into the grooves 137, rotation of the actuating member 152 will cause the grooves 158 and 162 to be moved out of alignment with the grooves 148, 150 respectively, causing the ring portion 154 to slide over the ears 104 and 106, and thereby locking the ears within the grooves 137 and the flange 102 in flush engagement in the recess 138 of the flange 132.

When the neck assembly 20 is inserted into the retainer assembly 130 as described, the lock pin 117 is retracted to the unlocking position thereof shown in FIG. 14 by engagement of the reduced end 118 with a projection 179 secured in the flange 132 and projecting outwardly therefrom. Thus, when the flange 32 of the fitting 99 is forced into the recess 138, the projection 179 contacts the reduced end 118 forcing the pin 117 downwardly against the action of the spring 121. It is understood that the interrelation of the ears 104 and 106 with the slots 148, 158 and 150, 162 respectively, properly position the flange 32 so that contact between the projection 179 and the reduced end of the lock pin 118 will be made. The neck assembly 20 together with the bag 18 is now locked in position beneath the coin machine. Upon movement of the actuator 152 to lock the neck assembly 20 to the retainer assembly 130, the roller 62 of the shutter 54 is forced outwardly as described hereinabove, thereby retracting the shutter 54 to the position shown in FIG. 18. In this position, the opening 36 in the flange 32 communicates with the opening 100 in the fitting 99 and thereby provides for communication of the coin machine discharge chute with the interior of the bag 118. During the movement outwardly of the shutter 54, the projection 56 is moved into engagement with the notch 58 and upon further outward movement of the shutter, the detent 40 is pivoted to the position shown in FIG. 18, the detent being retained in this position by the spring loaded pin 48. The detent is now preconditioned to lock the shutter 54 over the opening 36 when the shutter is returned to the closed position thereof shown in FIG. 19.

When it is desired to remove the bag 18 from the coin machine for emptying the coins deposited therein, the handle 168 of the actuator 152 is grasped, and the actuator rotated to the original position thereof, whereby the grooves 158 and 162 are again aligned with the grooves 148 and 150 respectively. The ears 104 and 106 are then uncovered and the neck assembly, together with the bag 18 are free to drop from engagement with the retainer assembly 130. Movement of the actuator 152 to the original position thereof also causes the shutter 54 to be moved inwardly to close the opening 36, and since the detent 40 had been preconditioned upon outward movement of the shutter 54 (FIG. 18), upon the inner movement thereof, the end portion 44 of the detent 40 will positively engage the notch 60 so that manual retraction of the shutter 54 is prevented. The sealed bag may then be removed from the chamber 14 of the coin machine 10 by an attendant who will carry the bag to a coin collection station. Authorized personnel may insert the key 74 into the lock 72 which releases the actuating ring 82 and upon rotation thereof, the zipper 98 may be opened to remove the coins from the bag 18.

It is also contemplated interconnecting the electrical operating system of the coin machine 10 with the bag locking device 16 so that the coin machine will be put in operating condition only if the neck assembly 20 is secured to the retainer assembly 130. For this purpose, an interlock switch 181 (FIG. 13) is provided and is secured to the flange 131 of the retainer assembly. In order to depress a switch button 182 that breaks the contacts of the normally closed switch 181, a plunger 183 is positioned in an opening formed in the flange 132 and is located in alignment with the switch button. A ball 184 is also located in the opening but projects therefrom for engagement by the rotatable ring portion 154 of the actuator 152. A groove 185 (FIG. 15) is formed on the surface of the ring portion and is adapted to receive the ball 184 therein.

Figures 26, 27:
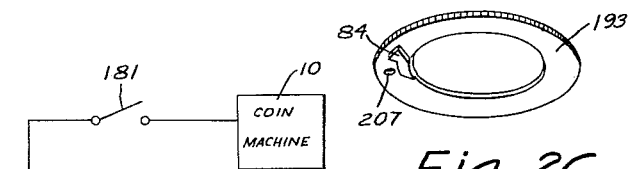
FIG. 26 is a perspective view of the actuating ring for the modified form of the invention.
FIG. 27 is a schematic electrical diagram showing the position of the interlock switch with respect to the coin machine.

When the actuator is located in the fully rotated position thereof, thereby locking the neck assembly 20 to the retainer assembly 130, the ball 184 falls within the groove 185, and the normally closed switch 139 completes a circuit to the coin machine 10 (FIG. 27). When the neck assembly 20 is released from engagement with the retainer assembly, the actuator 152 is rotated to the position shown in FIG. 12 thereby causing the ball 184 to be lifted out of the groove 185. This forces the plunger 183 into engagement with the button 182 causing the contacts in the interlock switch 181 to separate thereby breaking the circuit to the coin machine. The coin machine is now inoperative and may be put into operative condition only upon insertion of the neck assembly 20 and bag 118 attached thereto into engagement with the retainer assembly 130.

*Operation*

In operation of the device illustrated in FIGS. 1 through 19, it is assumed that in the first instance the bag has been removed from the coin machine 10 and has been carried to a coin collecting station for removal of coins deposited therein. In order to remove the coins from the bag 18, the key 74 is inserted into the lock 72 to cause the plunger 78 to be withdrawn from the opening 80 in the actuating ring 82. The actuating ring 82 is then rotated to cause the lug 88 and the depending portion 90 formed thereon to clear the recess 94 formed in the projection 92. The zipper operator 96 is then pulled downwardly to open up the zipper 98 thereby affording access to the bag interior for removal of the coins contained therein. Once the coins have been removed from the bag 18, the bag 18 is closed, the operator 96 being returned to the recess 94. The actuating ring 82 is rotated to the original position thereof, and the key 74 is then turned to its orignal position to cause the plunger 78 to lock the actuating ring 82 from movement. In the original movement of the actuating ring 82 to uncover the zipper operator 96, the pin 46 of the detent 40 was engaged by the cam 84 to cause the detent 40 to pivot to the position shown in FIG. 17. In this position, the shutter 54 is preconditioned for moving outwardly to expose the opening 36.

With the bag 18 locked and the shutter 54 preconditioned for opening, the bag 18 is returned to the coin machine 10, and the ears 104 and 106 are inserted into the grooves 148, 150 and 160, 162, the larger ear 106 fitting within the larger grooves 150, 162. By forming the ears and grooves in this manner, the correct position of the neck assembly 20 with respect to the retainer assembly 130 is assured. The ears 104 and 106 are forced upwardly against the pins 135 to release the actuator 152 for movement, and upon rotation of the ring portion 154 by movement of the lever 166, the ears 104 and 106 are caused to be engaged between the surfaces of the ring member 154 and the grooves 137 formed in the flange 132. Rotation of the actuator 152 to the locking position thereof causes the interlock switch 181 to be closed thereby closing the circuit to the coin machine 10. Movement of the lever 166 further causes the roller 64 of the shutter 54 that is positioned in the slot 141 and 172 to be moved outwardly, thereby retracting the shutter to the open position as shown in FIG. 18. Upon the outward movement of the shutter 54 the projection 56 engages the notch 58 of the detent 40 and thereby returns the detent to the latching position thereof shown in FIG. 18. The bag 18 is now installed in position in the coin machine and ready to receive coins. Once the bag has been filled with coins and removal thereof is necessary, the actuator 152 is returned to the original position thereof whereby the grooves 158, 162 are aligned with the grooves 148 and 150. This movement causes the shutter 54 to be returned to the closed position thereof as shown in FIG. 19, the notch 60 being engaged by the end portion 44. The ears 104 and 106 are then aligned with the grooves 148, 158 and 150, 162, respectively, and the bag drops free of the coin machine for removal to a coin collection station.

Figure 22:
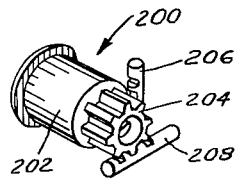
FIG. 22 is a perspective view of the means for locking the actuating ring and bag collar in the modified form of the invention.
Figure 21:
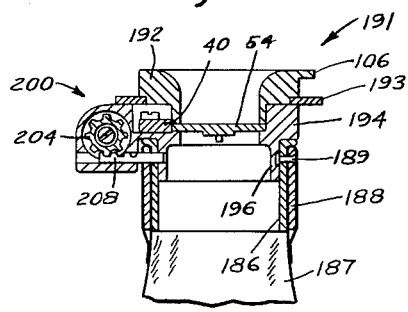
FIG. 21 is a sectional view taken along line 21—21 in FIG. 20.
Figure 23:
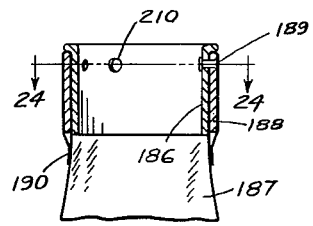
FIG. 23 is a sectional view taken along line 23—23 in FIG. 20.
Figure 24:
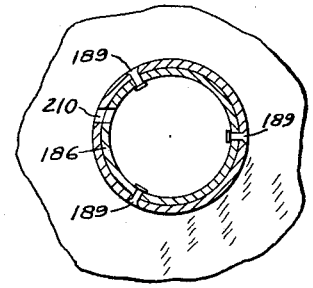
FIG. 24 is a sectional view taken along line 24—24 in FIG. 23.
Figure 25:
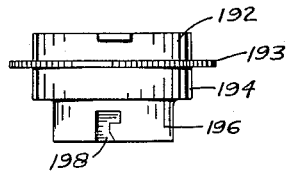
FIG. 25 is an elevational view of the neck assembly of the modified form of the invention.

Referring now to FIGS. 20 through 26, a modified form of the invention is illustrated, and in this form of the invention, the zipper bag is eliminated and a totally enclosed bag is provided wherein removal of the coins is through the neck or mouth of the bag. The neck assembly as described hereinabove is essentially the same in the modified form of the invention as is the retainer assembly therefor. However, in the modified form of the invention a metal ring 186 (FIG. 23) is secured by rivets 189 to a metal collar 188 and formed as a permanent part of the bag construction. As shown in FIGS. 21 and 23, the upper end of the bag 187 overlaps the collar 188 and is stitched or adhered to the bag body at 190. The neck assembly generally indicated at 191 (FIG. 21), includes a fitting 192 to which an actuating ring 193 is loosely secured. The actuating ring 193 rests on a flange 194 to which a reduced neck section 196 is integrally joined. Formed in the neck section 196 are J-slots 198, the neck section 196 telescopingly fitting within the metal ring 186 and the heads of the rivets 189 extending into the J-slots. It is seen that by rotating the neck assembly 191 within the metal ring 186, the heads of the rivets 189 will be positively engaged in the J-slots 198 thereby clamping the neck assembly 191 to the metal ring 186. In order to lock the neck assembly 191 to the metal ring 186, thereby preventing unauthorized removal of coins from the bag 187, the locking mechanism generally indicated at 200 is provided. As shown in FIG. 22, the locking mechanism includes a lock 202 to which a gear 204 is operatively connected. A vertically movable rack or plunger 206 operatively engages the gear 204 and is adapted to engage an opening 207 formed in the actuating ring 193. Also engaging the gear 204 is a horizontally reciprocating plunger 208 that is adapted to be inserted into an opening 210 extending through the metal ring 186 and collar 188 (FIG. 23). It is seen that with the plunger 208 located in the opening 210, the neck assembly 191 is positively locked on the bag 187, and that removal thereof is only possible by inserting a key into the lock 200 and rotating the gear 204. Rotation of the gear 204 withdraws the plunger 206 from the opening 207 and at the same time withdraws the plunger 208 from the opening 210. The actuating ring 193 is then released for pivoting the detent 40 thereby preconditioning the shutter 54. Withdrawal of the plunger from the opening 210 unlocks the neck assembly 191 which may then be removed from engagement with the metal ring 186 to expose the bag interior. The coins contained in the bag are then dumped out therefrom through the mouth thereof. Since the zipper has been eliminated in the modified form of the invention, the lug is also eliminated from the actuating ring. The operating structure for moving the shutter 54 and for locking the neck assembly to the retainer assembly is the same as that described above.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except as indicated by the scope of the appended claims.

What is claimed is:

1. In fare receiving apparatus, a coin machine, a tamper proof receptacle having a mouth adapted to communicate with said coin machine for receiving fare parts therefrom, means for securing said receptacle to the underside of said coin machine, a shutter for closing said mouth, said securing means including means for moving said shutter to an open position when said receptacle is mounted under the coin machine and for moving said shutter to a closed position when said receptacle is removed from said coin machine, means for locking said shutter in the closed position thereof, means for releasing said locking means so that said shutter may be moved to the open position thereof when said receptacle is mounted under said coin machine by said securing means, and means carried by said shutter for resetting said locking means when said receptacle is mounted under said coin machine, wherein said locking means engages said shutter for locking it in the closed position thereof when said receptacle is later removed from said coin machine.

2. In fare receiving apparatus, a coin machine, a tamper proof receptacle for receiving fare parts deposited in said coin machine, means for operatively securing said receptacle to said coin machine, means associated with said securing means for closing said receptacle when it is removed from said coin machine, said closing means including a reciprocating shutter that is adapted to close communication between the mouth of said receptacle and said coin machine, means for locking said shutter in the closed position thereof, means for releasing said locking means, and means for resetting said locking means simultaneously with the mounting of said receptacle in said coin machine, so that when said receptacle is to be later removed from said coin machine, said locking means will lock said shutter in the closed position thereof.

3. In fare receiving apparatus, a coin machine, a tamper proof receptacle for receiving fare parts deposited in said coin machine, means for removably securing said receptacle to said coin machine, a closure, means for operating said closure to close said receptacle upon removal thereof from said coin machine, means for locking said closure in the closed position thereof, means for releasing said locking means after said receptacle is removed from said coin machine, whereby upon securing said receptacle to said coin machine, said operating means moves said closure to the open position thereof to provide communication between said coin machine and said coin receptacle, said receptacle including a neck assembly that is secured to the upper end of said receptacle in the mouth thereof, an opening formed in said neck assembly, said closure being slidably mounted in said neck assembly across said opening, said releasing means including an actuating ring operatively mounted on said neck assembly that is adapted to engage a detent that is pivotally secured to said neck assembly, said detent being movable by said actuating ring out of engagement with said closure to release said closure from the locked position thereof.

4. In fare receiving apparatus, a coin machine, a tamper proof receptacle for receiving fare parts deposited in said coin machine, means for removably securing said receptacle to said coin machine, a closure, means for operating said closure to close said receptacle upon removal thereof from said coin machine, means for locking said closure in the closed position thereof, means for releasing said locking means after said receptacle is removed from said coin machine, whereby upon securing said receptacle to said coin machine, said operating means moves said closure to the open position thereof to provide communication between said coin machine and said coin receptacle, said receptacle including a zipper assembly that is adapted to be opened to provide for access to the interior of said receptacle when said receptacle is removed from engagement with said coin machine, and means associated with said releasing means for affording access to the operator of said zipper assembly when said receptacle is to be opened.

5. In fare receiving apparatus, a coin machine, a tamper proof receptacle for receiving fare parts deposited in said coin machine, means for removably securing said receptacle to said coin machine, a closure, means for operating said closure to close said receptacle upon removal thereof from said coin machine, means for locking said closure in the closed position thereof, means for releasing said locking means after said receptacle is removed from said coin machine, whereby upon securing said receptacle to said coin machine, said operating means moves said closure to the open position thereof to provide communication between said coin machine and said coin receptacle, a switch electrically connecting said coin machine to a source of power, and means responsive to movement of said closure to the closed position thereof by said operating means for opening said switch to break the circuit to said coin machine.

6. In fare apparatus, a coin machine for receiving fare parts, a receptacle adapted to be mounted on said coin machine and having a mouth that is normally open when said receptacle is secured to said coin machine, said receptacle thereby being adapted to receive said fare parts from said coin machine after the processing of said fare parts therethrough, means for securing said receptacle to said coin machine, and means cooperating with said securing means for closing said mouth upon removal of said receptable from said coin machine, said securing means including an annular flange having spaced ears formed thereon, means mounted on said coin machine and receiving said ears therein, and means slidable with respect to said ears to lock said annular flange to said coin machine.

7. In fare receiving apparatus as set forth in claim 6, said closing means including a guide and an actuator engaging said guide mounted on said coin machine, a shutter mounted on said receptacle and operatively engaging said guide and actuator, said actuator being movable relative to said guide to cause linear movement of said shutter, whereby said shutter is movable relatively with respect to the mouth of said receptacle to close said mouth.

8. In fare registering apparatus, a tamper proof receptacle comprising a flexible bag having a mouth, a zipper assembly adapted to close said bag and including an operator adapted to be located in close proximity to said mouth when said zipper assembly is in the closed position thereof, a neck assembly secured to said bag at the mouth thereof and having an opening extending therethrough communicating with the interior of said bag, means for securing said neck assembly to said fare registering apparatus so that the opening therein communicates with the interior of said apparatus and fare parts deposited in said apparatus will be directed into said bag, means for closing said opening when said bag is removed from the fare part receiving position, means for locking said closing means in the closed position thereof simultaneously with the removal of said bag from said fare part receiving position, means for unlocking said locking means prior to insertion of said bag in the fare part receiving position, and means for resetting said locking means when said bag is reinserted into the fare part receiving position so that when said bag is again removed therefrom said closing means will be locked in the closed position thereof.

9. In fare registering apparatus, a tamper proof receptacle comprising a flexible bag having a mouth, a zipper assembly secured to said bag and including an operator adapted to be located in close proximity to said mouth when said zipper assembly is in the closed position thereof, a neck assembly secured to said bag and having a reduced neck section extending within the mouth of said bag, an opening extending through said neck assembly and communicating with the interior of said bag, means for securing said neck assembly to the underside of said fare registering apparatus so that said bag is adapted to receive fare parts deposited therein, means for closing said opening when said bag is removed from engagement with said fare registering apparatus, said closing means including a shutter and a manually operated actuator operatively connected thereto, and means for locking said shutter in the closed position thereof when said bag is removed from the assembly thereby sealing the mouth of said bag and preventing unauthorized access to the interior thereof, said locking means including means for simultaneously locking said zipper operator for preventing movement thereof when the shutter is in the closed position thereof.

10. In a tamper proof receptacle, a bag, a neck assembly secured to the mouth of said bag and having an opening formed therein communicating with the interior of said bag, a shutter mounted in said neck assembly and adapted to close said opening for preventing access to the interior of said bag, means for locking said shutter in the closed position thereof, an actuating ring mounted on said neck assembly and including means for releasing said locking means, said shutter including means for resetting said locking means upon movement of said shutter to the open position thereof, so that when said shutter is returned to the closed position thereof it will be locked therein.

11. In a tamper proof receptacle as set forth in claim 10, said locking means including a pivotally mounted pawl that is adapted to engage a notch formed in said shutter.

12. In a tamper proof receptacle, a bag, a neck assembly secured to the mouth of said bag and having an opening formed therein communicating with the interior of said bag, a shutter mounted in said neck assembly and adapted to close said opening for preventing access to the interior of said bag, means for locking said shutter in the closed position thereof, means for releasing said locking means and said shutter including means for resetting said locking means upon movement of said shutter to the open position thereof so that when said shutter is returned to the closed position thereof it will be locked therein, said releasing means including an actuating ring and a lock mechanism that is accessible exteriorly of said bag for locking or unlocking said actuating ring, said actuating ring including a cam that is adapted to engage said locking means for removing said locking means to an unlocked position thereof upon rotation of said actuating ring.

13. In a tamper proof receptacle, a bag, a neck assembly secured to the mouth of said bag and having an opening formed therein communicating with the interior of said bag, a shutter mounted in said neck assembly and adapted to close said opening for preventing access to the interior of said bag, means for locking said shutter in the closed position thereof, an actuating ring mounted on said neck assembly and including means for releasing said locking means, said shutter including means for resetting said locking means upon movement of said shutter to the open position thereof, so that when said shutter is returned to the closed position thereof it will be locked therein, a zipper assembly closing said bag and including an operator, said actuating ring including a lug for locking said zipper operator in the closed position thereof, said actuating ring releasing said operator upon rotation thereof, whereupon said zipper operator is movable to an open position to provide access to the interior of said bag.

14. In a tamper proof receptacle, a bag, a metal ring secured to the mouth of said bag by securing members, a neck assembly formed with slots therein that are adapted to receive said securing members for mounting said neck assembly on said bag, said neck assembly including an opening formed therein and a shutter for closing said opening, means for locking said shutter in the closed position thereof, and means releasing said locking means and simultaneously releasing said neck assembly from engagement with said metal ring, whereby access to the interior of the said bag may be had through the mouth thereof.

15. In fare receiving apparatus, a coin machine, having a discharge chute, a receptacle for receiving fare parts deposited in said coin machine, means for removably securing said receptacle to said coin machine, a neck assembly mounted in the mouth of said receptacle and including an opening that provides for communication between the discharge chute of said coin machine and the interior of said receptacle, said neck assembly including a shutter for closing said opening upon removal of said receptacle from engagement with said coin machine, means for locking said shutter in the closed position thereof simultaneously with the removal of said receptacle from said coin machine upon release of said securing means, means mounted on said neck assembly for releasing said locking means so that when said receptacle is returned to said coin machine for securement thereto by said securing means, said shutter will be free to move to the open position thereof to provide communication between said coin machine and said receptacle, and means for presetting said locking means upon mounting of said receptacle in said coin machine so that upon later removal of said receptacle from said coin machine, said locking means will be actuated to lock the shutter in the closed position thereof.

16. In fare registering apparatus as set forth in claim 15, a switch electrically connecting said coin machine to a source of power, and means responsive to movement of said shutter to the closed position thereof for opening said switch to break the circuit to said coin machine.

17. In fare receiving apparatus, a coin machine, a tamper proof receptacle having a mouth, means for opening the body of said receptacle to gain entry into the interior thereof when removing fares therefrom, means for removably securing said receptacle to said coin machine, a closure for said mouth, said securing means including means for simultaneously closing said mouth with said closure when said receptacle is removed from engagement with said coin machine and for simultaneously removing said closure from said mouth when said receptacle is secured to said coin machine, means for locking said closure in the closed position thereof, and means for resetting said locking means simultaneously with the remounting of said receptacle in said coin machine, so that when said receptacle is later removed from said coin machine, said locking means will be actuated to lock said closure in the closed position thereof, and means for unlocking said locking means to release said closure when said receptacle is removed from said coin machine, said unlocking means further including means for providing access to said opening means when the fares are to be removed from said receptacle.

References Cited in the file of this patent

UNITED STATES PATENTS

| | | |
|---|---|---|
| 351,011 | Wherry | Oct. 19, 1886 |
| 2,096,476 | Veale | Oct. 19, 1937 |